Patented May 2, 1933

1,906,910

UNITED STATES PATENT OFFICE

LEON LILIENFELD, OF VIENNA, AUSTRIA

CELLULOSE THIOURETHANES AND PROCESS FOR MAKING SAME

No Drawing. Original application filed July 23, 1924, Serial No. 727,805, and in Austria April 4, 1924. Divided and this application filed February 3, 1927. Serial No. 165,748.

According to the present invention, new cellulose derivatives may be obtained by causing compounds derived from ammonia in which an alkyl group is substituted for at least one hydrogen atom of the ammonia, and in which at least one hydrogen atom of the ammonia can be replaced, to react with the products or reaction mixtures obtained by the action of a monohalogen derivative of a fatty acid on a cellulose-xanthic-acid or a cellulose-xanthate (viscose).

The new cellulose compounds are insoluble or only sparingly soluble in water, but are soluble in alkalies to give solutions which on addition of an agent that neutralizes the alkali (for example an organic or inorganic acid, an acid salt, an ammonium salt, or the like) or of a dehydrating agent (for example a salt, alcohol, or the like), yield precipitates or coagula which may be obtained in transparent, solid, flexible form such as threads, films, or plates by bringing the solution in a suitable form. The new cellulose derivatives dissolve also, according to the nature of the alcohol radical introduced into the aminogroup, and according to the character of the cellulose component, in solutions of alkaline earths, in ammonia, in organic solvents or mixtures of solvents, such as bases (for example in many primary, secondary and tertiary amines of the aliphatic and aromatic series, in poly-amines, in quaternary bases of acyclic, cyclic and heterocyclic structure, in bodies of the quanidine and pyridine series, in phenols, in carbon disulphide, in mixtures of carbon disulphide with mono- or polyhalogen hydrocarbon derivatives, in halogen-hydrins of polyhydroxylic alcohols, and the like). The presence of some water improves the solubility of the new cellulose compounds. Their solutions in suitable volatile solvents, e. g. aqueous pyridine, yield on drying, transparent, flexible products (such as films, layers, threads or plates).

In the new cellulose compounds there are obtained for the first time substances of the cellulose group which can be worked up into technical products, by precipitation of their alkaline solutions, as well as by evaporation of their solutions in volatile solvents. These products are superior in many respects to those obtainable from the known cellulose derivatives which are soluble in alkali, for instance, in respect of their firmness in contact with water As already stated, the present invention concerns the reaction of cellulose-xantho-fatty acids or their salts or derivatives, with compounds derived from ammonia, containing an alkyl group in place of at least one of the hydrogen atoms of the ammonia and in which at least one hydrogen atom of the ammonia can still be replaced. By the expression cellulose-xantho-fatty acid (cellulose-thionthiol-carbon-hydroxy paraffin monocarboxylic acid) in the description and claims are to be understood the products or reaction mixtures which may be obtained by acting on a cellulose-xanthic acid or a cellulose-xanthate (a thion-thiol-carbonic ester of cellulose, or a salt of such ester) with a monohalogen derivative of a fatty acid, or a salt or derivative thereof.

The cellulose-xanthic acid residue present in the cellulose-xantho-fatty acid may contain as the cellulose component cellulose itself, or a conversion product of cellulose, or any suitable cellulose compound.

As nitrogen compounds for the purpose of the invention there come into consideration organic compounds in which at least one hydrogen atom of the ammonia is replaced by an alkyl group, and in which there is still at least one hydrogen atom of the ammonia which can be replaced, in the first place the primary or secondary alkyl or aralkyl amines or hydroamines (oxalkyl bases). The nitrogen compounds may be used in the free state, or in the form of their salts or derivatives.

The conditions may be varied within wide limits. On this account, the invention is not limited to the details of the following description of its practical utilization (illustrated by working examples) since these details do not affect the essence of the invention.

The cellulose-xantho-fatty acids are advantageously prepared by acting upon a cellulose-xanthic acid, namely an alkali compound of a thion-thiol-carbonic ester of cellulose without excess in alkali (for example, crude or purified form of viscose which has been neutralized or made acid by addition of a weak acid), or upon an alkali compound of a thion-thiol-carbonic ester of cellulose with alkali in excess (for instance, a crude or purified viscose of alkaline reaction), or upon a compound of cellulose-xanthic acid with another metal (for example, zinc) with a monohalogen derivative of a fatty acid, or a salt or a derivative thereof (for example, according to the process described in my United States Patent No. 1,642,587). The cellulose-xanthic acid or cellulose-xanthate may be treated with the halogen-fatty acid either in dilute or concentrated solution, or as a paste, or in the form of the product of the reaction between alkali cellulose and carbon disulphide before bringing it into solution. The cellulose-xanthic acid or the cellulose-xanthate (viscose) may be converted into the cellulose-xantho-fatty acid either in the crude state or after purification by any known method.

It is to be understood that, where the context permits, the expression "viscose", "cellulose-xanthic acid" and "cellulose-xanthate" used in the description and claims include the forms of cellulose-xanthic acid or cellulose-xanthate (viscose) named in the preceding paragraph.

The reaction between the cellulose-xanthic acid or cellulose-xanthate, and the halogen derivative of the fatty acid on the one hand, and that between the cellulose-xantho-fatty acid and the organic nitrogen compound on the other hand, may be carried out in two separate operations, or may be combined to one operation. The organic nitrogen compound can therefore be caused to react with the isolated cellulose-xantho-fatty acid, or with the crude reaction mixture obtained in its preparation, or with the cellulose-xantho-fatty acid in the nascent state. That is to say, the nitrogen base may be brought into reaction either with the isolated cellulose-xantho-fatty acid or a salt thereof, or with the reaction mixture containing it, or with the cellulose-xanthic acid or cellulose-xanthate (viscose) before, during or after addition of the halogen-fatty acid or salt or derivative thereof.

The treatment of the cellulose-xantho-fatty acid, or salt thereof, with the organic nitrogen compound may be carried out in neutral, alkaline or acid solution, and the cellulose-xantho-fatty acid may be used for the reaction in the solid state or in suspension, for instance in alcohol.

In most cases, the reaction occurs at ordinary temperature; gentle or stronger heating usually accelerates it.

The nitrogen compound may be added in excess, in the theoretical quantity, or in an amount which is less than the theoretical quantity.

The formation of the new cellulose compounds manifests itself by precipitation of the end-product when the reaction is carried out in solution, and when the reaction mixture does not contain any substance which will dissolve the end-product or hinder its formation (for example a sufficient quantity of alkali). This precipitate forms a stiff or soft jelly if the solution of the cellulose-xanthic acid, or cellulose-xanthate, or cellulose-xantho-fatty acid is concentrated, or if the solution is not stirred, or is stirred only a little; if the solution is suitably diluted and stirred the product separates in the form of a one or coarse precipitate.

The final product of the reaction may be isolated for example by separating the precipitate or the jelly from the mother-liquor by filtering, straining through cloth, centrifuging or the like, and then washing it thoroughly with water. As a rule, the jelly contracts on standing for some time, and shows separation of liquid. The mother-liquor and the washing water contain as chief by-product of the reaction the corresponding thio-hydroxy paraffin-mono-carboxylic acid. If the precipitate is a jelly, or is bulky, it is necessary to break it up before the washing process. In order to remove any by-products of the reaction which are insoluble or difficultly soluble in water, the washing with water may be followed by a washing with alcohol, or first with alcohol and then with ether, benzene or the like. The compound after washing may then either be dissolved in the wet condition (if necessary after previously removing the bulk of adhering wash-liquid by pressing, filtering, suction or centrifuging), or dried.

If no precipitate is formed, or if complete precipitation of the end-product does not occur spontaneously, the product may be isolated, for example by treating the reaction mixture before or after completion of the reaction with an acid or an acid salt until a precipitate is produced, and then proceeding as already described.

According to their mode of formation and chemical behaviour, the new cellulose compounds produced according to the invention are thiourethanes (thio-carbamic acid esters or xanthamides) of cellulose or of the cellulose group, in which at least one hydrogen atom of the amido group is replaced by an alkyl group. According to whether this alcohol radical is a simple alkyl, or an aralkyl group, the new cellulose derivatives will be alkylthiourethanes (alkyl-thio carbamic acid esters, alkylxanthamides), or aralkyl-thiourethanes (aralkyl-thiocarbamic acid esters, aralkyl-xanthamides), of cellulose.

The simplest type of the new cellulose derivatives may be represented by the following formula (without however limiting the invention to this):

$$R.NH.CS.O(C_{6n}H_{10n-1}O_{5n-1}), \text{ or}$$
$$R.N:C(SH).O.(C_{6n}H_{10n-1}O_{5n-1}),$$

wherein R represents the alcohol radical which has been introduced into the amido group. This radical may be an alkyl or oxyalkyl group, or an aralkyl or oxyaralkyl group.

Where the context permits in the description and claims, the expression "alkyl" includes also oxyalkyl and hydroxyalkyl, and "aralkyl" includes also oxyaralkyl and hydroxyaralkyl.

The reactions leading to the formation of the new cellulose compounds may be represented for the simplest type by the following equations. As an example, are taken sodium cellulose xanthate, sodium chloracetate, and methyl amine.

Formation of cellulose-xanth-acetic acid:

$$(C_{6n}H_{10n-1}O_{5n-1}).O.CS.S.Na +$$
$$Cl.CH_2.COONa =$$
(sodium cellulose xanthate)
$$(C_{6n}H_{10n-1}O_{5n-1}).O.CS.S.CH_2.COONa +$$
$$NaCl$$
(sodium cellulose xanth-acetate)
(sodium cellulose thionthiol-carbon-glycollate)

Formation of methyl-thiourethane of cellulose:

$$(C_{6n}H_{10n-1}O_{5n-1}).O.CS.S.CH_2.COONa +$$
$$CH_3.NH_2 =$$
(sodium cellulose-xanth-acetate)
$$CH_3.NH.CS.O.(C_{6n}H_{10n-1}O_{5n-1}) +$$
$$CH_2(SH).COONa$$
(methyl-thiourethane of cellulose) (sodium thioglycollate)

The invention is in no way limited to the equations given above, since these are given only for the purpose of illustration, and since an exhaustive and exact statement of the chemistry of the reaction is not a simple and readily solved problem in view of the imperfect knowledge of the constitution of cellulose.

The invention is illustrated by the following examples, the parts being by weight:

1.

(a) 1000 parts of crude viscose (prepared for example by impregnating 100 parts of sulphite-cellulose in fleece or sheet-form with 1000–2000 parts of caustic soda solution of 18 per cent. strength at 15–18° C., allowing the mixture to stand at room temperature for 3–24 hours, pressing until the mass weighs 300–350 parts, comminuting in a shredder or the like, allowing to mature if necessary for 6–72 hours at room temperature, treating for several hours with 50–60 parts of carbon disulphide, and dissolving in sufficient water to bring the total weight of the solution to 1000 parts), corresponding with 100 parts of cellulose as parent material, are diluted, either in the freshly prepared condition, or after standing for a short or long period (6 hours to 3 days), with 5000 parts of water, and then treated, whilst stirring, with dilute acetic acid (e. g. 5–10 per cent. strength) until the mixture shows a neutral or faintly alkaline reaction. As soon as the hydrogen sulphide liberated during the neutralization has escaped entirely or for the greater part, the viscose which has become light in colour is treated with a solution of sodium monochloracetate prepared by dissolving 60–100 parts of monochloracetic acid in 480–800 parts of water and neutralizing the solution with powdered sodium bicarbonate. When the solution of sodium monochloracetate has been incorporated with the viscose, the mixture is stirred for a short time and then allowed to stand at room temperature. After 6–48 hours standing, there are added to the mixture (which may be neutralized should it react faintly alkaline) whilst stirring, 30–60 parts of ethyl amine. After a short time, the reaction product begins to separate in the form of flakes or jelly-like lumps when the mixture is well stirred. As soon as the precipitation is complete, or after the mixture has been allowed to stand after the precipitation for a period of from several hours to three days, the precipitate is separated from the mother-liquor by decanting, filtering, filtering under suction, straining through cloth or centrifuging; by acidifying the mother-liquor, for instance with sulphuric acid, extracting it with ether and distilling the ether, a considerable quantity of thioglycollic acid can be detected (for example by the reaction toward ferric chloride and ammonia or by obtaining it in the pure state). The precipitate which has been separated from the mother-liquor is thoroughly washed with water and dried at atmospheric or reduced pressure, if desired, after one or more treatments with alcohol, or with alcohol followed by ether.

The final product is a powdery substance, especially after grinding, insoluble or practically insoluble in water, alcohol or ether, but soluble in the following solvents, for example: dilute caustic alkali (for instance caustic soda of 5–10 per cent. strength), guanidine, especially in presence of some water, quaternary bases, piperidine, especially in presence of some water, pyridin, especially in presence of some water.

An elementary analysis gave the following results:

| Calculated for $C_{15}H_{25}NSO_{10}$ [$C_2H_5.NH.CS.O.(C_{12}H_{19}O_9)$] | Found |
|---|---|
| C_____ 43.79 | 43.14; 43.33 |
| H_____ 6.08 | 6.45; 6.32 |
| S_____ 7.78 | 7.90; 8.08 |
| N_____ 3.40 | 3.54; 3.39 |

Ash: 0.31%.

Taking into account the fact that the substance analyzed was not specially purified, the above figures are in good agreement with those of an ethyl-thio-urethane of cellulose or of a body of the cellulose class (ethyl-thiocarbamic acid ester of cellulose).

When a solution of the substance in dilute caustic soda (for example of 5–10 per cent. strength) is spread on a glass plate and treated with a suitable precipitating bath (e. g. a solution of ammonium chloride of 20 per cent. strength, dilute sulphuric acid, or aqueous acetic acid), there is obtained a skin, strong when wet, and transparent and shining when dry.

A solution of the body in an aqueous solution of pyridine of 70–80 per cent. strength yields on drying, a transparent, flexible film, having a notable resistance towards water. Its useful properties are not destroyed even by heating for several days at 60° C.

(b) The procedure is as in Example 1(a), with the modification that there are used only 30–40 parts of monochloracetic acid, dissolved in 320–400 parts of water and neutralized.

The ethyl thiourethane of cellulose so obtained dissolves readily in dilute caustic soda, but does not dissolve in aqueous pyridine as readily as does the product of Example 1(a).

(c) The procedure is as in Examples 1(a) or 1(b), with the exception that the ethyl amine is added immediately or soon after (for example 10 minutes to 1 hour) the sodium monochloracetate has been incorporated with the viscose.

(d) The procedure is as in Examples 1(a), 1(b) or 1(c), with the exception that 200–500 parts of monochloracetic acid dissolved in 1600–4000 parts of water and neutralized with powdered sodium bicarbonate are used.

(e) The procedure is as in Examples 1(a), 1(b), 1(c) or 1(d), with the exception that from the beginning the reaction mixture is kept at 8 to 12° C., until the addition of ethyl amine takes place.

(f) The procedure is as in Examples 1(a), 1(b), 1(c), 1(d) or 1(e), with the variation that the viscose is made faintly acid or distinctly acid by addition of dilute acetic acid. The properties of solubility of the product are not altered by this modification.

(g) The procedure is as in Examples 1(a), 1(b), 1(c), 1(d), 1(e) or 1(f), with the exception that the soda cellulose is reduced to 200 parts by pressing, and is sulphidized by means of 20–25 parts of carbon-disulphide.

2.

The procedure is as in any of the Examples 1(a) to 1(g), with the exception that instead of ethyl amine there is used an equivalent amount of methyl amine.

The methyl thiourethanes of cellulose obtained correspond in their appearance, properties and solubilities with the ethyl thiourethanes described in Example 1.

3.

The procedure is as in any of the Examples 1(a) to 1(g), with the modification that instead of ethyl amine there is added to the cellulose-xanth-acetic acid an equivalent amount of diethylamine. The reaction occurs remarkably quickly. The diethyl-thiourethane of cellulose which separates in a finely divided state is insoluble or barely soluble in caustic soda solution of 1–10 per cent. strength after washing and drying. It is readily soluble in aqueous pyridine of about 90 per cent strength, giving a solution which yields on drying a lustrous transparent skin which is flexible and is resistant towards water.

4.

In another modification, benzylamine is used instead of the ethyl amine of Example 1. The product, cellulose benzyl thiourethane, is soluble in somewhat stronger caustic alkali solutions, e. g. NaOH solution of 10 per cent strength, particularly if a small quantity of alcohol is added, but insoluble in weak solutions, e. g. 1 per cent NaOH solution. Otherwise the solubilities are like those of Example 1.

5.

Instead of the ethyl amine used in Example 1, there is used an equivalent amount of phenyl-ethylamine ($C_6H_5.CH_2.CH_2.NH_2$). The cellulose-phenyl-ethyl-thiourethane separates in flakes shortly after the addition, and after washing and drying, is insoluble in caustic soda solution, but dissolves readily in an aqueous solution of pyridine of 90 per cent. strength, to a solution which yields on drying a clear, lustrous, flexible film, which is very resistant towards water.

6.

The procedure only differs from that of the preceding examples in that the viscose is not neutralized before addition of the monochloracetic acid; the reaction mixture is neutralized or made faintly or distinctly acid, for example, with dilute acetic acid before the addition of the ethyl amine or other amine.

Generally speaking the products so obtained exhibit the same properties and solubilities as do those prepared from viscose which has been neutralized, or made faintly or distinctly acid.

It is also possible to work by not neutralizing the viscose either before addition of the monochloracetic acid or before addition of the ethyl amine or other amine; in the latter case the reaction with the amine occurs more slowly, and the final product is precipitated after a longer interval of time and in a less finely divided condition.

7.

(a) 1000 parts of viscose prepared according to the method described in Example 1, corresponding with 100 parts of cellulose as parent material, are diluted with 2000 parts of water, and treated with the solution prepared by dissolving 65–70 parts of monochloracetic acid in 260–280 parts of water and neutralizing the acid with solid sodium bicarbonate. After standing for 4–48 hours, the liquid mixture is neutralized with acetic acid of 10 per cent. strength, 30–60 parts of ethyl amine are added, and the mixture stirred. The product separates after a short time; it may be separated from the mother-liquor either soon after the precipitation is complete, or after standing for 1–7 days, and may then be worked up as described in Example 1.

The ethyl thiourethane of cellulose forms a more or less fine powder after drying, and possesses properties and solubilities similar to those of the product described in Example 1(a).

(b) The procedure is as in Example 7(a), with the difference that there are used only 50–60 parts of monochloracetic acid dissolved in 200 parts of water and neutralized with solid sodium bicarbonate.

The ethyl thiourethane of cellulose so obtained is a powdery or flaky substance; it is soluble in dilute caustic soda, for example of 1–10 per cent. strength, but is less soluble in aqueous pyridine of 70–80 per cent. strength than is the product of Example 7(a).

| Calculated for $C_{27}H_{45}NSO_{20}$ [$C_2H_5.NH.CS.O.(C_{24}H_{39}O_{19})$] | Found |
|---|---|
| N ----------------------- 1,90 | 1,82 |
| S ----------------------- 4,35 | 4,28 |

Solutions of the substance in caustic soda yield on precipitation with an acid, transparent, lustrous, flexible films. Solutions of the substance in pyridine yield flexible skins on drying.

(c) The procedure is as in 7(a) or 7(b), but with the modification that there are added to the viscose only 30 parts of monochloracetic acid which have been dissolved in 120 parts of water and neutralized. The ethyl-thiourethane of cellulose so obtained dissolves readily in dilute caustic soda, but is less soluble in pyridine than is the product obtained in 7(a) or 7(b).

8.

The procedure is as in Examples 7(a), 7(b) or 7(c), with the difference that the viscose is neutralized with dilute acetic acid before the addition of the sodium chloracetate.

9.

1000 parts of viscose prepared as described in Example 1 are neutralized, without previously diluting by means of a solution of acetic acid of 10 per cent. strength, and there is then added, whilst stirring, the solution prepared by dissolving 80–90 parts of monochloracetic acid in 240–300 parts of water and neutralizing with powdered sodium bicarbonate.

There are added whilst stirring, either directly afterwards, or after an interval of 10 minutes 30–60 parts of ethyl-amine, whereupon the mixture is either stirred until precipitation begins or is completed, or it is allowed to stand. In the first case, the product separates as flakes or small pieces; in the second case, it solidifies to a gelatinous mass which gradually contracts with separation of the mother-liquor. The precipitate (if a jelly it is first broken up or cut up), is washed and worked up as described in Example 1.

In the foregoing examples, there may be used instead of monochloracetic acid an equivalent amount of a halogen derivative of a homologue of acetic acid, for instance α-bromopropionic acid, α-brombutyric acid, or bromosuccinic acid. The products so obtained resemble those obtained by using monochloracetic acid. The mother-liquor contains instead of thioglycollic acid the corresponding thiohydroxy paraffin-monocarboxylic acid (for example thio lactic acid, thiooxy-α-butyric acid or thio-malic acid or the like.)

Instead of using crude viscose, there may be used in the foregoing examples viscose which has been purified by any suitable method, for example by precipitating it with a saturated solution of common salt, and washing the precipitate with a salt solution of 10 per cent. strength.

Furthermore, in the foregoing examples, instead of bleached or unbleached sulphite-cellulose there may be used as the parent material for preparing the cellulose-xanthic acid or cellulose-xanthate, any other bleached or unbleached cellulose (such as cotton or linters), or a material containing cellulose, or a conversion-product of cellulose (for example a hydratized or hydrolized cellulose or oxycellulose obtained for example by mercerization with strong lye, and washing if necessary; by grinding in presence of water; by the action of a strong mineral acid, zinc halids, or an ammoniacal solution of copper oxide; or by any other method), or a cellulose derivative which contains a free hydroxyl group to enable it to be converted into the thion-thiol-carbonic acid ester (for example an alkyl, oxyalkyl or hydroxyalkyl derivative of cellulose, a cellulose-hydroxy paraffin monocarboxylic acid, and the like).

In the description and claims, wherever the context permits, the expression "cellulose", alone or in combination with "xanthic acid", "xanthate", "xantho-fatty-acid", "xanthic acid ester", "thiocarbamic acid ester", or "thio-urethane", is used in each combination for shortness and includes cellulose itself and the conversion products and derivatives referred to in the preceding paragraph.

10. 100 parts of air-dried cellulose-xanthacetic acid prepared as in Example 1 of my U. S. Patent No. 1,642,587 are dissolved in 4000–5000 parts of an aqueous solution of ethyl amine of 0.5 per cent. strength, there are then added to the solution 30–60 part of ethyl amine, and the mixture is stirred. After a short while the solution becomes thick and slimy, and the separation of the ethyl thiourethane of cellulose soon begins.

After about 10–48 hours, the white precipitate may be separated from the mother-liquor and worked up as in the previous examples.

The expression "amine", "aliphatic amine", and the like used in the description and claims, are intended to mean: all primary and secondary alkyl and aralkyl amines or hydramines, their salts and derivatives or compounds, as well as substances or mixtures of substances which give rise to such amines or to such amines or to their salts or derivatives or compounds.

In the claims, the expression "aliphatic amine" is not intended to include amino acids.

The expression "alkyl", in the description and the claims, includes, wherever the context permits, alkyl and aralkyl.

The expression "cellulose-xantho-fatty acid" in the description and claims includes the products or reaction mixtures which may be obtained by treating a cellulose xanthic acid or a cellulose xanthate (for example any form of viscose which may be alkaline, neutral or acid), with a monohalogen derivative of a fatty acid, or with a salt or derivative thereof. This expression is intended also to include hte salts of such cellulose-xanthofatty acids, and also substances or mixtures of substances which give rise to such cellulose-xantho-fatty acids or to salts thereof.

The expressions "halogen derivative of a fatty acid", "monochloracetic acid" and the like, used in the description and claims mean the free acids themselves or salts or derivatives thereof.

The expression used in the claims "in the form of unshaped products" is intended to mean: flakes, powder, sand, crumbs, bits, solutions, pastes, and the like.

The expression "cellulose thiourethane, in which at least one hydrogen atom of the amido group is replaced by an alkyl radical" means in the description and claims: an N-alkyl-, or N-aralkyl-thiourethane of the cellulose group, in which the cellulose component is either cellulose itself or a conversion product or compound of cellulose; that is to say, as far as the present invention is concerned, the expression includes those products which may be obtained by acting with a compound derived from ammonia in which at least one hydrogen atom of the ammonia is replaced by an alkyl or aralkyl group, on a cellulose-xantho-fatty acid, that is to say, on the products obtained by the reaction between viscose and a monohalogen-derivative of a fatty acid or a salt thereof.

The present application is a division of my copending application Serial No. 727,805 filed July 23, 1924, now Patent No. 1,674,401.

I claim:

1. A process for the manufacture of new cellulose compounds which comprises acting on a cellulose-xantho-fatty acid with a compound derived from ammonia in which at least one hydrogen atom of the ammonia is replaced by an alkyl group, and at least one hydrogen atom of the ammonia can still be replaced.

2. A process for the manufacture of new cellulose compounds which comprises acting on a cellulose-xantho-fatty acid with a compound derived from ammonia in which at least one hydrogen atom of the ammonia is replaced by an aralkyl group, and at least one hydrogen atom of the ammonia can still be replaced.

3. A process for the manufacture of new cellulose compounds which comprises acting on a cellulose-xantho-fatty acid with an aliphatic amine in which at least one hydrogen atom of the amino group can be replaced.

4. A process for the manufacture of new cellulose compounds which comprises acting on a cellulose-xanth-acetic acid with an aliphatic amine in which at least one hydrogen atom of the amino group can be replaced.

5. A process for the manufacture of new cellulose compounds which comprises bringing together viscose and a monohalogen derivative of a fatty acid, and acting on the so-obtained reaction mixture with an alipathic amine in which at least one hydrogen atom of the amino group can be replaced.

6. A process for the manufacture of new cellulose compounds which comprises bringing together viscose and monochloracetic acid, and acting on the so-obtained mixture with an aliphatic amine in which at least one hydrogen atom of the amino group can be replaced.

7. A process for the manufacture of new cellulose compounds which comprises treating viscose simultaneously with a monohalogen derivative of a fatty acid and with an aliphatic amine containing at least one hydrogen atom of the amino group capable of being replaced.

8. A process for the manufacture of new cellulose compounds which comprises treating viscose simultaneously with monochloracetic acid and with an aliphatic amine containing at least one hydrogen atom of the amino group capable of being replaced.

9. As new products, alkyl thiourethanes of the cellulose group in the form of unshaped products.

10. As new products, aralkyl thiourethanes of the cellulose group.

11. As new product, an alkyl thiourethane of the cellulose group.

12. A process for the manufacture of new cellulose compounds which comprises acting on a cellulose-xantho-fatty acid with a compound of the type $(C_nH_{2n+1})_yNH_{3-y}$ where $y$ is not greater than 2.

13. As a new product, a cellulose thiourethane containing the group of the type $(C_nH_{2n+1})_yNH_{2-y}$ where $y$ is not greater than 2.

14. The process of forming a new cellulose compound which comprises reacting upon a cellulose-xantho-fatty acid with an amine of the type $(C_nH_{(2n+1)-x}R_x)_yNH_{3-y}$ where $y$ is not greater than 2 nor less than 1, $x$ any value from and including 0 to $(2n+1)$, and R an aromatic group.

15. As a new product, a cellulose thiourethane containing the group

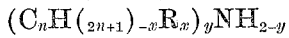

where $y$ is not greater than 2 nor less than 1, $x$ any value from and including 0 to $(2n+1)$, and R an aromatic group.

16. A compound of cellulose of the type

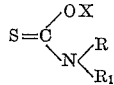

where X is a cellulose residue after removal of at least one hydroxyl hydrogen atom from cellulose, R a hydrogen atom, or alkyl, oxyalkyl, hydroxyalkyl, aralkyl, oxyaralkyl or hydroxyaralkyl group, and $R_1$ an alkyl, oxyalkyl, hydroxyalkyl, aralkyl, oxyaralkyl or hydroxyaralkyl group.

17. A compound of cellulose of the type

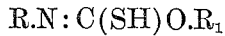

wherein $R_1$ is a cellulose residue after removal of at least one hydroxyl hydrogen atom from cellulose, and R an alkyl, oxyalkyl, hydroxyalkyl, aralkyl, oxyaralkyl or hydroxyaralkyl group.

In testimony whereof I affix my signature.

LEON LILIENFELD.